United States Patent
Everill et al.

(10) Patent No.: US 9,399,719 B2
(45) Date of Patent: Jul. 26, 2016

(54) HIGH CARBON NANOTUBE CONTENT FLUIDS

(71) Applicant: Molecular Rebar Design, LLC, Austin, TX (US)

(72) Inventors: Paul Everill, Austin, TX (US); Clive P. Bosnyak, Austin, TX (US); Michael Gauthier, Austin, TX (US)

(73) Assignee: Molecular Rebar Design, LLC, Austin, TX (US)

( * ) Notice: Subject to any disclaimer, the term of this patent is extended or adjusted under 35 U.S.C. 154(b) by 58 days.

(21) Appl. No.: 14/499,290

(22) Filed: Sep. 29, 2014

(65) Prior Publication Data

US 2015/0090920 A1   Apr. 2, 2015

Related U.S. Application Data

(60) Provisional application No. 61/884,872, filed on Sep. 30, 2013.

(51) Int. Cl.
| | |
|---|---|
| *C09D 11/52* | (2014.01) |
| *H01B 1/24* | (2006.01) |
| *C01B 31/02* | (2006.01) |

(52) U.S. Cl.
CPC ............ *C09D 11/52* (2013.01); *C01B 31/0273* (2013.01); *H01B 1/24* (2013.01)

(58) Field of Classification Search
CPC .. C09D 11/52; C01B 31/0273; C01B 31/022; C01B 31/0226; C01B 31/0233; C01B 31/024; C01B 31/0246; C01B 31/0253; C01B 31/026; C01B 31/0266; C01B 31/028; C01B 31/0286; C01B 31/0293; C01B 2202/00; H01B 1/24
USPC ........ 423/447.1–447.3, 445 B; 977/742–754, 977/842–848; 428/367; 252/62.2, 511
See application file for complete search history.

(56) References Cited

U.S. PATENT DOCUMENTS

| 7,682,590 B2 | 3/2010 | Sakakibara et al. |
| 2011/0294013 A1 | 12/2011 | Bosnyak et al. |
| 2011/0311876 A1 | 12/2011 | Sturgeon et al. |

FOREIGN PATENT DOCUMENTS

| EP | 1665446 B1 | 3/2012 |
| WO | 2009/155267 | 12/2009 |
| WO | 2012/083358 | 6/2012 |
| WO | 2013/011516 | 1/2013 |

OTHER PUBLICATIONS

Rosca, et al., Oxidation of multiwalled carbon nanotubes by nitric acid, Carbon 2005; 43: 3124-3131.*
Krause, Correlation of carbon nanotube dispersability in aqueous surfactant solutions and polymers, Carbon 2009; 47: 602-612.*
Vaisman, et al., The role of surfactants in dispersion of carbon nanotues, Advances in Colloid and Interface Science 2006; 128-130; 37-46.*
Moore, et al., Individually Suspended Single-Walled Carbon Nanotubes in Various Surfactants, Nano Letters 2003; 3(10): 1379-1382.*
Jiang, et al., Production of aqueous colloidal dispersions of carbon nanotubes, Journal of Colloid and Interface Science 2003; 260: 89-94.*
White, S.I., et al; "Simulations and electrical conductivity of percolated networks of finite rods with various degrees of axial alignment", Department of Materials Science & Engineering Departmental Papers (MSE), University of Pennsylvania, Jan. 2009.
Halelfadl et al., "Viscosity of carbon nanotubes water-based nanofluids: Influence of concentration and temperature", 71 Int'l J. Thermal Sci. (Sep. 1, 2013), pp. 111-117.
International Preliminary Report on Patentability (PCT/US2014/057947), dated Dec. 15, 2015.

* cited by examiner

*Primary Examiner* — Daniel C McCracken
(74) *Attorney, Agent, or Firm* — Gregory L. Porter; Andrews Kurth LLP

(57) ABSTRACT

New homogeneous fluids with a viscosity less than about three Poise comprising discrete carbon nanotubes with volume fractions above the percolation threshold concentration calculated for randomly oriented rods in a liquid are disclosed. A method is also disclosed for production of the new fluids. The fluids are particularly useful for making battery pastes.

20 Claims, No Drawings

HIGH CARBON NANOTUBE CONTENT FLUIDS

CROSS REFERENCE TO RELATED APPLICATIONS

This application claims priority to U.S. Provisional Patent Application Ser. No. 61/884,872, entitled "High Carbon Nanotube Content Fluids," filed Sep. 30, 2013, the entire content of which is incorporated by reference.

STATEMENT REGARDING FEDERALLY SPONSORED RESEARCH

Not applicable

BACKGROUND

Applications such as electrospinning and printing require highly mobile fluids as they are often passed through small orifices with diameters at micrometers or less scale. Electrospinning uses electrical forces to produce polymer fibers with nanometer-scale diameters. Electrospinning occurs when the electrical forces at the surface of a polymer solution or melt overcome the surface tension and cause an electrically charged jet to be ejected. Having carbon nanotubes in the fluid could aid in development of electrical forces and uniformity of the voltage gradient for improved printability. It is also highly desirable to have concentrated yet mobile fluids of carbon nanotubes for efficient dispersion into materials such as lead oxide or silicon particles that are can be made into pastes for energy storage or collection devices such as batteries, capacitors and photovoltaics. Yet another need for concentrated yet mobile fluids of carbon nanotubes is for the formation of uniform thin electrical conducting coatings, for example in displays and sensors. The coating thicknesses are often at the micrometer scale or below and require higher concentrations of solids to reduce drying times and hence lower cost of manufacturing.

A challenge with creating mobile fluids with high solids content wherein the solid is a rod-like structure is that at certain concentrations the rods can interact with each other. This is called the percolation threshold concentration. Studies have shown that the volume concentration percolation threshold, V, generally follows the equation $V=0.6/(L/D)$, where L is the length and D is the diameter of the rod. An example of a reference to this equation is "Simulations and electrical conductivity of percolated networks of finite rods with various degrees of axial alignment" S. I. White B. A. DiDonna, M. Mu, T. C. Lubensky and K. I. Winey. Department of Materials Science & Engineering Departmental Papers (MSE), University of Pennsylvania Year 2009. The ratio L/D is also called the aspect ratio of the rod. Above the percolation threshold concentration the properties of the composite show a change in performance, such as large increases in viscosity. For example, if the interactions of the rods are sufficient, gels can form. The nature of the interactions between rods can be, for example, mechanical or electrostatic. An example of mechanical interaction is where flexible rods entangle.

Carbon nanotubes can be classified by the number of walls in the tube, single wall, double wall and multiwall. Each wall of a carbon nanotube can be further classified into chiral or non-chiral forms. Carbon nanotubes are currently manufactured as agglomerated nanotube balls or bundles. They are well known to have good electrical and thermal properties.

PCT US 2011/0294013A1 has disclosed exfoliated carbon nanotubes, methods of production and products thereof. The terms "exfoliated" or "discrete" are used to indicate that the carbon nanotubes are untangled from clusters or associated bundles of carbon nanotubes that are the result of their original manufacture using, for example, catalysts in a gas phase reactor. During the process of making discrete carbon nanotubes (which can be in single, double and multiwall configurations), the nanotubes are cut into segments and optionally functionalized. The cutting of the tubes reduces the length of the tubes into carbon nanotube segments that are defined here as Molecular Rebar.

Various methods have been developed to unbundle carbon nanotubes in solution. For example, carbon nanotubes may be extensively shortened by oxidative means and then dispersed in dilute solution. Concentrations of carbon nanotubes in the solutions are often less than 0.1 percent weight/volume. Carbon nanotubes may also be dispersed in solution as individuals by sonication in the presence of a surfactant. Illustrative surfactants used for dispersing carbon nanotubes in solution include, for example, sodium dodecyl sulfate and block polymers such as polyethylene oxide-polypropylene oxide polymers sold under the Pluronic® trademark by BASF. In some instances, solutions of individualized carbon nanotubes may be prepared from polymer-wrapped carbon nanotubes. Individualized single-wall carbon nanotube solutions have also been prepared using polysaccharides, polypeptides, water-soluble polymers, nucleic acids, DNA, polynucleotides, polyimides, and polyvinyl pyrrolidone. Disclosed in U.S. Pat. No. 7,682,590 B2 are carbon nanotubes dispersed in polar organic solvent and methods for producing the same. In this disclosure, single wall carbon nanotubes taken directly from the high pressure carbon monoxide process without being oxidized are dispersed at concentrations of 0.01% by weight using non-ionic surfactants in n-methylpyrrolidone and furthermore, filtered using filters with porosity 0.1 to 3 micrometers. The resultant more dilute filtrate mixture of single wall carbon nanotubes is reportedly stable and does not form visible aggregates or settle.

In each of these methods of unbundling carbon nanotubes in fluid media, such as water, the concentration of carbon nanotubes in the fluid medium is below their percolation threshold volume concentration. Since carbon nanotubes can have lengths of many micrometers, yet be 1-50 nanometers in diameter, this means that percolation threshold concentrations can be as little as fractions of a percentage by volume. It is therefore highly desirable to obtain fluids of carbon nanotubes of solids content above the percolation threshold concentration as determined by the length and diameter of the carbon nanotubes for applications requiring maximum content carbon nanotubes and minimum content solvent, or maximum carbon nanotube content and minimum fluid viscosity. One example of an application is the addition of discrete carbon nanotubes to lead oxide paste where the allowable water content is restricted and there is a need for a high concentration of discrete carbon nanotubes within the lead oxide paste . . . .

In some applications, for example printing inks and coatings, the fluid containing concentrations of discrete carbon nanotubes above the percolation threshold can be dried to form a film in which the discrete carbon nanotubes collapse upon each other into a dense network of tubes and surfactant. The film is non-dustable and conductive. The film, being a polymer encapsulated collection of discrete carbon nanotubes, provides reduced safety concerns for users, with minimal inhalation risks. The drying process which creates this film is identical to that observed during printing of inks; the printed ink will also be un-dustable, adhering well to paper and other substrates, with a minimal chance of discrete carbon nanotubes being released to the air or environment. The higher concentration of discrete carbon nanotubes in the mobile fluid allows such processes as, but not limited to, ink-jet printing and faster drying.

SUMMARY

The present disclosure, in various embodiments, describes a homogeneous fluid comprising discrete carbon nanotubes and surfactant, wherein a volume fraction, V, of the carbon nanotubes in the fluid is in the range determined from the equation $0.6 \leq V*(L/D) \leq 3$, wherein L is the average length of the carbon nanotube in nanometers, D is the average diameter of the carbon nanotube in nanometers, and wherein the fluid has a viscosity less than 3 Poise at 25° C. Put another way, the value of X, from the equation $X=V*(L/D)$, can be from a lower value of about 0.6 or more, or preferably about 0.8 or more; to a higher value of X of about 3 or less, preferably about 2.7 or less, more preferably about 2 or less, most preferably about 1.4 or less. The higher and lower limits just disclosed for the value of X can be combined in any combination, but the most preferred combination is when the value of X is from about 0.8 to about 1.4. The fluid can be polar or non-polar, organic or aqueous in nature. Organic fluids can be, but are not limited to, alkanes, aromatics, alcohols, ethers, esters, ketones, amides, nitriles and amines. Water is preferred.

In one embodiment, the fluid comprising discrete carbon nanotubes and surfactant further comprises discrete carbon nanotubes with surfaces comprising oxygen moieties in the weight range of 0.5 to 8% by weight of the discrete carbon nanotube. Although not limiting in scope, typical discrete carbon nanotube surface functional groups comprising oxygen moieties are hydroxyl and carboxylate groups. The oxygen moieties can further comprise organic or inorganic moieties.

In another embodiment, the fluid comprising discrete carbon nanotubes and surfactant further comprises discrete carbon nanotubes wherein the majority of discrete carbon nanotubes are open ended. The discrete carbon nanotubes are preferred to have residual catalyst content from making the non-discrete carbon nanotubes less than about 2% by weight of the discrete carbon nanotubes.

In one embodiment, the fluid comprising discrete carbon nanotubes and surfactant can also comprise at least one other species selected from the group of carbonaceous materials such as, but not limited to, carbon black, graphene, oxidized graphene, or carbon fibers. The carbon fibers are distinguished from discrete carbon nanotubes by having average fiber diameters greater than 100 nanometers and solid throughout the fiber diameter.

In another embodiment, the fluid comprising discrete carbon nanotubes and surfactant comprises surfactant in the range of weight fraction of surfactant relative to the weight of discrete carbon nanotubes greater than about 0.2 and less than about 3. The lower weight fraction is greater than about 0.2, preferably greater than about 0.25, preferably greater than about 0.6 or preferably greater than about 1. The higher weight fraction is less than about 3, preferably less than 2.5, more preferably less than about 1.5. For polyvinyl alcohol as a surfactant the preferred range of weight fraction of surfactant relative to the weight of dry carbon nanotubes is 0.225 to 0.55. The surfactant may comprise a polymer, or a combination of polymers, that is soluble in the fluid to at least 0.5% by weight of the polymer relative to the weight of fluid. The polymer can further comprise an oxygen and/or sulfur moiety, preferably polyvinyl alcohol or copolymers thereof. The polyvinyl alcohol or copolymer can comprise at least about 50% by mole of vinyl hydroxyl groups. The surfactant comprising a sulfur moiety can further comprise sulfonated groups. An example of a surfactant comprising a sulfur moiety is polystyrene sulfonate. The polymer further comprises a weight average molecular weight less than about 200 kDa, preferably less than 100 kDa.

In yet another embodiment, the fluid comprising discrete carbon nanotubes and surfactant wherein at least one of the surfactants is at least partially bound to the discrete carbon nanotube, preferably 2% of the surfactant is bound, more preferably about 20%, more preferably about 50%, even more preferably about 80% and as much as 100%.

In yet another embodiment, this invention discloses a method to obtain a homogeneous fluid comprising discrete carbon nanotubes and surfactant, wherein a volume fraction, V, of the carbon nanotubes in the fluid is in the range determined from the equation $0.6 \leq V*(L/D) \leq 3$, wherein L is the average length of the carbon nanotube in nanometers, D is the average diameter of the carbon nanotube in nanometers, and wherein the fluid has a viscosity less than 3 Poise at 25° C., comprising the steps of:

a) forming a mixture comprising 1-50% by weight of carbon nanotubes in fluid, b) adding a surfactant to the carbon nanotube mixture in an amount suitable to obtain a carbon nanotube:surfactant weight ratio from about 1:0.2 to about 1:3.

c) optionally, adding the surfactant as a solution in the fluid, d) optionally, where the fluid comprises water, adjusting pH of the fluid to between 4 and 9, preferably 6-8, most preferably about 7, e) optionally, adjusting the carbon nanotube volume concentration, and f) agitating the mixture while maintaining the temperature below 35° C. preferably using a high intensity mixer, until a constant viscosity is obtained.

In various embodiments, the fluid can be used for the manufacture of carbon nanotube-containing structures including: fibers, films, coatings, layers, energy storage/collection devices, photoactive pastes, or electroactive pastes, more specifically for lead acid or lithium ion batteries.

One embodiment comprises a lead acid electroactive paste comprising the fluid comprising discrete carbon nanotubes and surfactant. The lead acid electroactive paste comprises lead oxide. Additional components of the electroactive paste could include lead, lead sulfate, barium sulfate, carbon black and lignin sulfonate.

Another embodiment comprises a lithium ion electroactive paste comprising the fluid comprising discrete carbon nanotubes and surfactant. The lithium ion electroactive paste can comprise lithium containing compounds or elements that alloy with lithium to allow absorption and desorption of lithium ions. Examples of lithium containing compounds include lithium transition metal oxides or phosphates such as, but not limited to, lithium iron phosphate, lithium cobalt oxide, lithium manganese oxide, lithium manganese phosphate, lithium titanate, and lithium manganese nickel cobalt oxide.

Elements that alloy with lithium are for example, but not limiting in scope, silicon, carbon, silicon carbon alloys, and tin. Additional components of the electroactive paste may comprise binders such as, but not limiting in scope, to, polyvinylidene fluoride, sodium carboxymethylcellulose, polyacrylic acid, polyacrylonitrile, polyvinyl alcohol, polyvinyl alcohol copolymers and styrene-butadiene copolymers.

A yet further embodiment is photovoltaic photoactive paste comprising the fluid comprising discrete carbon nanotubes and surfactant. The photoactive paste comprises photoactive compounds such as, but not limiting in scope to, titanium dioxide and tin oxide. The photoactive paste may further comprise photoactive materials physically or covalently bound to the discrete carbon nanotubes. The photoactive paste may further comprise a photoactive organic dye. The photoactive organic dye may also be bound to the surface of the carbon nanotubes. A preferred photoactive dye comprises Ruthenium.

Another embodiment is an electrolyte comprising the fluid comprising discrete carbon nanotubes and surfactant. Electrolytes are used in batteries, capacitors and photovoltaics, for example.

One embodiment provides an ink comprising the fluid comprising discrete carbon nanotubes and surfactant. The ink may further comprise additional conductive particles such as, but not limiting to, silver flakes, copper particles, copper oxide, graphene, graphenol. The ink may further comprise conductive polymers that are soluble in the fluid medium.

Another embodiment is a temperature stable homogeneous fluid comprising: discrete carbon nanotubes; and at least one amorphous surfactant, wherein $0.6 \leq V*(L/D) \leq 3$, wherein V is the volume fraction, L is the average length of the carbon nanotube in nanometers, D is the average diameter of the carbon nanotube in nanometers, and wherein the fluid has a viscosity less than 3 Poise at 25° C., wherein the fluid maintains a pourable viscosity from 0° C. to 60° C.

In yet another embodiment a homogeneous fluid comprising discrete carbon nanotubes; and at least one surfactant, wherein $0.6 \leq V*(L/D) \leq 3$, wherein V is the volume fraction, L is the average length of the carbon nanotube in nanometers, D is the average diameter of the carbon nanotube in nanometers, and wherein the fluid has a viscosity less than 3 Poise at 25° C., wherein the surfactant is biocompatible.

DETAILED DESCRIPTION

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification.

The term "carbon nanotubes" as used herein refers to allotropes of carbon with a cylindrical nanostructure. The nanotubes may be single, double or multiwall.

The term "discrete carbon nanotubes" as used herein refers to carbon nanotubes that are separated to give individual tubes without substantial further tube breakage. The individual tubes can be organized into structures such as a mat or oriented fibers comprising many individual tubes.

The term "graphene" as used herein refers to individual atomic thickness plates of carbon.

The term "oxidized graphene" as used herein refers to the products of oxidizing graphene plates. The oxidized species are generally at the edges of the graphene plates. The oxidized graphene may also be termed graphenol.

The term "oxidized carbon nanotubes" as used herein refers to the products of oxidizing the carbon nanotubes. Generally the oxidized species are carboxylic, ketone, lactone, anhydride or hydroxyl functionalities.

The term surfactant as used herein refers to a compound that lowers the interfacial tension between the carbon nanotube and the fluid. The surfactant may be covalently, ionically or hydrogen bonded to the carbon nanotube surface.

The term fluid as used herein refers to a liquid wherein the viscosity of the liquid is less than about 3 Poise at 25° C.

The term "homogeneous fluid" as used herein refers to a fluid having a viscosity of less than 3 Poise at 25 C. and uniform in composition, i.e., no visible lumps or irregularities by unaided human eye.

The density of the carbon nanotubes for interconversion of volume fraction and weight fraction is taken as 1.85 g per milliliter.

Discrete oxidized carbon nanotubes, alternatively termed exfoliated carbon nanotubes, are obtained from as-made bundled carbon nanotubes by methods such as oxidation using a combination of concentrated sulfuric and nitric acids. The techniques disclosed in PCT/US09/68781, the disclosure of which is incorporated herein by reference, are particularly useful in producing the discrete carbon nanotubes used in this invention. The bundled carbon nanotubes can be made from any known means such as, for example, chemical vapor deposition, laser ablation, and high pressure carbon monoxide synthesis. The bundled carbon nanotubes can be present in a variety of forms including, for example, soot, powder, fibers, and bucky paper. Furthermore, the bundled carbon nanotubes may be of any length, diameter, or chirality. Carbon nanotubes may be metallic, semi-metallic, semi-conducting, or non-metallic based on their chirality and number of walls. The discrete oxidized carbon nanotubes may include, for example, single-wall, double-wall carbon nanotubes, or multi-wall carbon nanotubes and combinations thereof.

During the process of making discrete or exfoliated carbon nanotubes (which can be single, double and multiwall configurations), the nanotubes are cut into segments, preferably with at least one open end, and residual catalyst particles that are interior to the carbon nanotubes as received from the manufacturer are removed at least partially. This cutting of the tubes helps with exfoliation. The cutting of the tubes reduces the length of the tubes into carbon nanotube segments that are defined here as Molecular Rebar, MR. Proper selection of the carbon nanotube feed stock related to catalyst particle type and distribution in the carbon nanotubes allows more control over the resulting individual tube lengths and overall tube length distribution. A preferred selection is where the internal catalyst sites are evenly spaced and where the catalyst is most efficient. The preferred aspect ratio (length to diameter ratio) is greater than about 25 and less than about 200 for a balance of viscosity and mechanical performance. Preferably, substantially all of the discrete carbon nanotubes tube ends are open ended after the MR conversion process. The selection can be evaluated using electron microscopy and determination of the discrete tube distribution.

Molecular Rebar has oxidized moieties on the surface. Oxidized moieties include, but are not limited to, carboxylates, hydroxyls, ketones and lactones. The oxidized species can react advantageously with species such as, but not limiting in scope to, an acyl halide, epoxy, isocyanate, hydroxyl, carboxylic acid, or amine group. This reaction may increase the stability of the dispersion of MR in the fluid. The weight fraction of oxidized moieties is determined from the weight loss in the temperature range 200 to 600° C. using a theromogravimetric analyzer in nitrogen run at 5° C./minute.

The residual catalyst in the Molecular Rebar is determined by heating the Molecular Rebar to 800° C. in air for 30 minutes using a thermogravimetric analyzer.

TABLE 1

| | Lengths (nm) | | |
|---|---|---|---|
| | Condition 1 | Condition 2 | Condition 3 |
| Mean | 424 | 487 | 721 |
| Standard Error | 25.3 | 34.9 | 50 |
| Median | 407 | 417.0 | 672 |
| Standard Deviation | 177 | 281 | 315 |
| Sample Variance | 31461 | 79108 | 99418 |
| Kurtosis | −0.83 | 1.5 | −0.02 |
| Skewness | 0.03 | 1.2 | 0.64 |
| Range | 650 | 1270.0 | 1364 |
| Minimum | 85 | 85.0 | 161 |
| Maximum | 735 | 1355 | 1525 |

Condition 1 is an example of a narrow distribution with low mean length. Condition 2 is an example of broad distribution with low mean length. Condition 3 is an example of high mean length and broad distribution.

Additives can be included and can further react or be completely inert with other components of the formulation. Fibrous additives can be surface active to react with surroundings. To determine tube lengths, a sample of tubes is diluted in isopropyl alcohol and sonicated for 30 minutes. It is then deposited onto a silica wafer and images are taken at 15 kV and 20,000× magnification by SEM. Three images are taken at different locations. Utilizing the JEOL software (included with the SEM) a minimum of 2 lines are drawn across on each image and measure the length of tubes that intersect this line.

Skewness is a measure of the asymmetry of a probability distribution. A positive value means the tail on the right side of the distribution histogram is longer than the left side and vice versa. Positive skewness is preferred for the nanotubes of the present invention, which indicates more tubes of long lengths. A value of zero means a relatively even distribution on both sides of the mean value. Kurtosis is the measure of the shape of the distribution curve and is generally relative to a normal distribution. Both skewness and kurtosis are unitless.

The following table shows representative values of discrete carbon nanotubes diameters:

TABLE 2

| Diameter (unrelated to condition above) | | | |
|---|---|---|---|
| Mean diameter (nm*) | 12.5 | | |
| Median diameter (nm) | 11.5 | | |
| Kurtosis | 3.6 | | |
| Skewness | 1.8 | | |
| Calculated aspect ratio (L/D) | 34 | 39 | 58 |

*nm = nanometer

As a result of the aforementioned, Molecular Rebar gives advantageous mechanical and transport properties when added to other materials compared to materials with no Molecular Rebar.

General Process to Make Discrete Carbon Nanotubes (DCNT) or Molecular Rebar (MR)

As manufactured carbon nanotubes, CNT, in the form of fibrous bundles can be obtained from different sources to make discrete carbon nanotubes. However, for the examples used herein, carbon nanotubes obtained from CNano, grade Flotube 9000 can be used. Flotube 9000 has less than 5% by weight of impurities of which about 4% by weight are residual catalyst metals. The average tube diameter is about 13 nanometers by scanning electron microscopy (SEM). Tube manufacturers can have different % impurities, tube diameter distributions and average tube diameter depending on manufacturing technique. Other tube manufacturers include Arkema and Southwest Nano Technologies, SWeNT Discrete Carbon Nanotube Formation (Exfoliation)

Nitric acid solution (greater than about 60 weight % concentration, preferably above 65% nitric acid concentration, in water) issued to exfoliate the carbon nanotubes. Mixed acid systems (e.g., nitric and sulfuric) can also be used, preferably at room temperature. Other oxidizing materials such as cumene peroxide, hydrogen peroxide or sodium persulfate may be utilized in addition to the acids. Various standard filtration systems may be used to separate carbon nanotubes from the oxidizing fluid such as centrifugation, vacuum and pressure. Oxidation type (acid, alcohol, ketones, and aldehydes) and their concentration distribution are affected by temperature, time, and other additional mechanical energy such as sonication energy. The type of oxidation species desired varies depending on the formulation requirements of each type of application. For example, with rubbers a high degree of bonding is desired between the rubber matrix and the discrete carbon nanotube surface. This may require high concentrations of carboxylic acid and hydroxyl groups on the discrete carbon nanotube surface.

The CNT's are added at about 1 to 5% by weight, preferably about 1.2% by weight per volume of acid into the nitric acid at 25 to 50° C., preferably about 50° C. in a mixer tank that is agitated and heated, if necessary. Acid is loaded first through a nozzle and CNT's are loaded through a hopper. The mixer is vented to a scrubber and runs under a slight negative pressure. The mixture is then pumped through a machine capable of high shear rates, such as a sonicator, rotor-stator, jet mill or a Gaulin Homogenizer and fed into a soak tank. The soak tank can be recycled back to the mix tank.

In another example, the CNT's are added at about 2 to 5% by weight, preferably about 3% by weight per volume of acid into the nitric acid at 25 to 90° C., preferably about 70° C. in a mixer tank that is agitated and heated, if necessary. Acid is loaded first through a nozzle and CNT's are loaded through a hopper. The mixer is vented to a scrubber and runs under a slight negative pressure. The mixture is then pumped through a machine capable of high shear rates, such as a sonicator, rotor-stator, jet mill or a Gaulin Homogenizer and fed into a soak tank. The soak tank can be recycled back to the mix tank.

In the soak tank the acid/CNT slurry is soaked at about 25 to 100° C., preferably 50 to 80° C. for one to eight hours dependent on the degree of oxidation required and then fed to a sonicator tank. This soak adds oxidation and helps reduce sonicator energy needed to oxidize and exfoliate. The tank is mixed.

After the CNT acid slurry is soaked it is pumped into the sonicator tank which has a mixer and is maintained at in the range 25 to 100° C.

An exemplary process for making discrete carbon nanotubes follows: A 16 liter mixture of 1.2% CNT's (obtained from CNano, Flotube 9000) in >65% nitric acid, is pumped at 1.5 l/min. thru a 1000 watt Hielscher cell using a 34 mm sonitrode. The back pressure is 30 psi, the amplitude is set at 85% and the recorded watts are at 500-600. After all of the 16 liters are pumped through the cell, the CNT slurry is drained back into the Sonicator Tank and the process is repeated until the CNT's are exfoliated to the desired specification, for example as tested by optical microscopy and/or UV absorption. The number of times the material is processed or repeated is dependent on the amount of overall energy required to achieve the desired degree of exfoliation. For CNT grade Flotube 9000, this energy is about 20,000 to 35,000 joules/gram, preferably 24,000 Joules/gram of CNT depending on the degree of exfoliation required. The required energy for CNT's supplied by other manufacturers, may be different. The required amount of energy will vary also by the degree of exfoliation required for a given application. For rubber reinforcement and lead batteries applications (such as pastes), the degree of exfoliation is desirably greater than about 95 percent (meaning that about 95 percent by weight of the fed raw CNT's are converted or separated into discrete carbon nanotubes; the remaining about 5 percent may remain substantially in the entangled state). The degree of oxidation can be measured by several tests such as OIs spectroscopy, energy dispersive X-ray and thermo-gravimetric analysis. Once done, the CNT's have been converted into discrete carbon nanotubes, or Molecular Rebar.

Filtration

After successful exfoliation the slurry mix of MR is transferred to the Filtration hold tank held at a constant temperature dependent on the acid mixture employed. This slurry of MR is much more viscous than the original slurry. For centrifugation it is desired to run at conditions where the slurry addition is matched to the fluid removal rates. If a vacuum belt filter is desired there is an acid removal zone and additional water wash zones may be employed. Pressure filters usually require 10 to 100 pounds per square inch of pressure. Filtration rates can be very slow in any filter system as MR cake compresses and orients. A thin cake allows a low pressure of filtration and more rapid rates of filtration. At thicker cakes, the pressure drop required for filtration increases dramatically and filtration is very difficult. The amount of acid removed is about 65-75% (about 5-6% wt./vol. of MR to acid remaining in the cake) in the acid removal step. This acid is recycled. The remaining acid is water washed away in stages using 25 to 50° C. water. The washed MR cake contains about 92-94% water and a low amount of acid (liquid phase about pH 3-5). The MR is scraped into a water slurry tank to make a slurry for dispersion. This slurry also can be treated with more water or other dilute acids or bases and filtered to remove more impurities if desired.

The pH of the MR slurry is adjusted, such as by dilute caustic, depending on the formulation chemicals. Formulation chemicals such as surfactants, for example, lignin sulfonate or polyvinylalcohol in the case of lead acid battery products, can be added, and the slurry is mixed.

The formulated MR is then pumped thru a high shear rate mixer, such as a sonicator, rotor-stator, jet-mill, or Gaulin Homogenizer, into the product tank. At this point the formulated MR is collected in the Product tank and tested for dispersion by optical microscopy and UV. It can be the final product as in the lead acid battery additive, or it can be a feedstock to the next step such as in the rubber Master Batch product. A further method may be to spray dry the dispersion and later disperse the discrete tubes in a fluid such as water using redispersing means such as the high shear rate mixers described above, or an extruder (single, or twin-screw).

Discrete carbon nanotubes, DCNT, of this invention can have an aspect ratio of from about 10 to about 500, preferably 25-200 and most preferably 50-120.

Another illustrative process for producing discrete carbon nanotubes follows: 3 liters of sulfuric acid (containing 97 percent sulfuric acid and 3 percent water), and 1 liter of concentrated nitric acid (containing 70 percent nitric acid and 30 percent water), are added into a 10 liter temperature controlled reaction vessel fitted with a sonicator and stirrer. 40 grams of non-discrete carbon nanotubes, grade Flotube 9000 from CNano corporation, are loaded into the reactor vessel while stirring the acid mixture and the temperature maintained at 30° C. The sonicator power is set at 130-150 watts and the reaction is continued for 3 hours. After 3 hours, the viscous solution is transferred to a filter with a 5 micron filter mesh and much of the acid mixture removed by filtering using a 100 psi pressure. The filter cake is washed one time with about 4 liters of deionized water followed by 1 wash of about 4 liters of ammonium hydroxide solution at pH greater than 9 and then 2 more washes with 4 liters of deionized water. The resultant pH of the final wash is 4.5.

A small sample of the filter cake is dried in vacuum at 100° C. for 4 hours and a thermo gravimetric analysis taken. The amount of oxidized species on the fiber is 8 percent weight and the average aspect ratio as determined by scanning electron microscopy to be 60. The discrete carbon nanotubes (DCNT or Molecular Rebar) in wet form are added to water to form a concentration by weight of 1 percent and the pH is optionally adjusted using ammonium hydroxide. Sodium dodecylbenzenesulfonic acid is added at a concentration of 1.5 times the mass of oxidized carbon nanotubes. The solution is sonicated while stirring until the discrete carbon nanotubes are fully dispersed in the solution. Sufficient dispersion of individual tubes (discrete) is defined when the UV absorption at 500 nm is above 1.2 absorption units for a concentration of $2.5 \times 10^{-5}$ g oxidized carbon nanotubes/ml.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof.

Materials comprising discrete carbon nanotubes can have other additives such as other fibers (carbon, graphite, graphene, polymeric (polypropylene, polyethylene to name just a couple), and particulates (such as powders (carbon black), sand, diatomaceous earth, cellulose, colloids, agglomerates, antimicrobials and inorganic salts).

The Molecular Rebar (MR) can comprise 0.01 to 90% by weight of the formulation, preferably 0.1 to 50, more preferably 0.25 to 25% by weight of the formulation.

Based on the desired application (such as reinforcing foam articles), 10% by weight or less of the discrete carbon nanotubes, MR, of the formulation can comprise L/D of about 100 to 200 and about 30% or more of the discrete carbon nanotubes MR of the formulation can comprise L/D of 40 to 80. The L/D of the discrete carbon nanotubes can be a unimodal distribution, or a multimodal distribution (such as a bimodal distribution). The multimodal distributions can have evenly distributed ranges of aspect ratios (such as 50% of one L/D range and about 50% of another L/D range). The distributions can also be asymmetrical—meaning that a relatively small percent of discrete carbon nanotubes can have a specific L/D while a greater amount can comprise another aspect ratio distribution. However, for this invention, the average of length and the average of diameter for the discrete carbon nanotubes is used for determining the value of "X."

One of ordinary skill in the art will recognize that many of the specific aspects of this invention illustrated utilizing a particular type of carbon nanotube may be practiced equivalently within the spirit and scope of the disclosure utilizing other types of carbon nanotubes.

EXPERIMENTAL EXAMPLES

The following experimental examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Example 1

15 g dry Molecular Rebar (Average Length, L, is about 900 nanometers; Average Diameter, D, is about 13 nanometers, 1.8% by weight oxidation and residual content 1.6% by weight) is placed in a 500 mL beaker. 3.375 g polystyrene sulfonate. PSS, (Spectrum Chemicals, Molecular weight, weight average 70 kDa) is added as 22.5 mL of a 15% stock solution and mixed with a 100 ml water using an overhead stirrer rotating at 800 rpm. This provides 1 part MR:0.225 parts PSS ratio, by weight. The mixture is adjusted to pH 7 with 1M NaOH and the overhead mixer is slowed to 300 rpm. The volume of the fluid is then adjusted to a total of 250 ml using water to produce a final mixture of 6.0% by weight MR and 1.35% by weight of PSS (1:0.225) at pH 7. The fluid is then sonicated using a sonication probe set at a power setting of approximately 40 W for 1 hour while maintaining a temperature below 35° C. The fluid is inspected using a light microscope at 45× magnification and shows a uniform dispersion of carbon nanotubes. After three weeks at 25° C. the dispersion remains uniform. The fluid has the viscosity of cream which is about 0.1 poise.

The value of X, from the equation $X=V*(L/D)$, is 2.71, where $V=[(MR\ Used, g)/(MR\ Density, g/mL)]/(Volume\ Dispersion, ml)=[15/1.85]/250=0.0324$, L about 900 nanometers, and D about 13 nanometers.

Example 2

30 g of Molecular Rebar (Average Length, L, of about 900 nanometers; Average Diameter, D, of about 13 nanometers, 1.8% by weight oxidation and residual content 1.6% by weight) and 570 ml of water is placed in a 1 liter beaker. 15 g polyvinyl alcohol, PVA, (Sigma, 87-90% hydrolyzed, molecular weight, weight average in the range 30-70 kDa) is added as 100 ml of a 15% stock solution and mixed with a 15 ml additional water using an overhead stirrer rotating at 800 rpm. This gives a 1 part MR to 0.5 parts PVA ratio, by weight. After 5 minutes of stirring the pH is adjusted to 7 with 1M NaOH. The mixture is observed to reduce its viscosity considerably and the overhead mixer is slowed to 300 rpm. The volume is adjusted to a total of 1 L using water to produce a final mixture of 3.0% Molecular Rebar and 1.5% polyvinyl alcohol (1:0.5) by weight at pH 7. This mixture is then chilled to 8° C. by overhead stirring in a cold room for 2 hours. A Matten-Gaulin mixer was pre-chilled by flowing 1 liter ice cold water through its system at a pressure of 50 MPa. The chilled MR mixture is then passed through the instrument twice. A complete dispersion retains the fluidity of milk which is about 3 cP over a period of weeks and maintains complete dispersion with little to no observable change.

The value of X from the equation $X=V*(L/D)$ is 1.12, where $V=[(MR\ Used, g)/(MR\ Density, g/mL)]/(Volume\ Dispersion, mL)=[30/1.85]/1000=0.0162$, average L is about 900 nanometers, and average D is about 13 nanometers.

Example 3

As example 2 except the MR has an average length of about 700 nanometers, average diameter about 13 nanometers, oxidation level about 2% by weight of MR and the final composition is 2.25% by weight and PVA 3.375% by weight.

The value of X from the equation $X=V(L/D)$ is 0.66.

Comparative Example 1

As example 2 except the pH of the mixture is not adjusted. The final pH of the mixture is about 2.5. The mixture is paste-like and difficult to stir. A complete uniform dispersion is not achieved.

This example illustrated the importance of controlling the pH of the aqueous mixture around 7.

Comparative Example 2

The process above is repeated, but 22.5 g of Molecular Rebar is used (Average Length, L, of about 900 nanometers; Average Diameter, D, of about 13, 1.8% by weight oxidation and residual content 1.6% by weight) and 37.5 ml 15% polyvinyl alcohol stock solution to give a mixture containing 2.25% MR and 0.56% polyvinyl alcohol (1:0.25) by weight at pH 7. This mixture was introduced into the Matten-Gaulin mixer at 50 MPa with no cooling. After one pass, the mixture thickened considerably and the temperature of the mixture increased from 28° C. to 41° C. Examination of the mixture by optical microscopy shows poor dispersion of the Molecular Rebar. A second pass did not alter the viscosity and failed to improve the quality of the dispersion, resulting in an inhomogeneous fluid. The second pass produced a temperature jump of 35° C. to 46° C.

The value of X from the equation $X=V*(L/D)$ is 0.84, where $V=[(MR\ Used, g)/(MR\ Density, g/mL)]/(Volume\ Dispersion, mL)=[22.5/1.85]/1000=0.0121$, average L is about 900 nanometers, and average D is about 13 nanometers. This example illustrates the importance of maintaining the temperature of the mixture during mixing below about 35° C. to obtain a good dispersion of Molecular Rebar with an X value above 0.6.

Comparative Example 3

22.5 g of dry Molecular Rebar (Average Length. L, is about 900 nanometers; Average Diameter, D, is about 13 nanometers, 1.8% by weight oxidation and residual content 1.6% by weight) is added to a 500 mL beaker. To this beaker, 11.25 g of polyvinyl alcohol is added as 75 ml of a 15% polyvinyl alcohol stock solution. Water is added to give a total volume of 250 ml and a mixture of 9% by weight Molecular Rebar and 4.5% by weight polyvinyl alcohol. Even after setting the pH of the mixture to 7 with 1M NaOH and chilling the beaker, the viscosity of the mixture is simply too high to be stirrable with the overhead stirrer. The mixture forms a high viscosity paste and Molecular Rebar does not disperse using sonication.

The value of X from the equation X=V*(L/D) is 3.36, where V=[(MR Used, g)/(MR Density, g/mL)]/(Volume Dispersion, mL)=[22.5/1.85]/250=0.0486, average L is about 900 nanometers, and average D is about 13 nanometers. This illustrates that to obtain a fluid dispersion of Molecular Rebar the value of X is less than about 3.

Example 4 and Comparative Example 4

Lead Acid Paste

Table 3 shows compositions for making an anode paste for a lead acid battery for comparative example 4 paste with no fluid containing discrete carbon nanotubes and example 4, a lead acid anode paste with fluid described in example 3. The expander (Hammond) is a composition of lignin sulfonate, barium sulfate and carbon black in the weight ratio 1:1:0.5, respectively. A typical flock is polyethylene terephthalate or nylon in a fibrous form and added to the dry powder of lead oxide. The expander is added to the dry powder of lead oxide, then water is added and mixed, followed by slow addition and mixing of sulfuric acid, 1.4 specific gravity, while maintaining the temperature below 55° C. In example 4, the fluid from example 3 is added together with the water to the lead oxide followed by slow addition of the sulfuric acid to make an anode material. The anode material is pasted to lead grids, dried and assembled into a battery with grids of dried lead oxide for cathodes, followed by standard battery formation as recorded elsewhere. i.e., Lead-Acid Batteries: Science and Technology: Science and Technology, Elsevier 2011. Author: D. Pavlov.

Relative to comparative example 4 paste with no MR. Example 4 showed a higher charge efficiency of at least 30% at 14.2v charging voltage, an increase rate of charge of at least 200% and at least 50% lower polarization between 14 and 15 volts. Polarization is the difference between the voltage of the battery under equilibrium and that with a current flow. Relative to comparative example 4 paste with no MR, Example 4 showed at least 60% increase cycle life, dynamic charge acceptance is higher by at least 50% and cold charge acceptance is higher by at least 10%.

Example 5

A fluid comprising discrete carbon nanotubes and one or more surfactants may bind to compounds containing elements of Group 1 through to 7, preferably Group 3 through to 7 of the standard periodic table. As an example, an aliquot of Example 3 was added to 50 mL of an aqueous fluid, either neutral or acidic. This mixture dilutes to form a well dispersed homogenous black/brown solution of final discrete carbon nanotube content approximating 0.1% w/v. When 10 g of lead oxide is added to this dilution and mixed briefly, the lead oxide sinks and the fluid becomes clear and colorless, indicating that the discrete carbon nanotubes have adhered to the lead oxide. Addition of 30 mg of carbon black to an equivalent acid solution of lead oxide as above did not result in a clear a fluid above the settled lead oxide in the same time frame.

TABLE 3

|  | Control Paste no MR % by weight | Example 4 % by weight |
|---|---|---|
| Lead Oxide | 81.66 | 81.40 |
| Fiber flock | 0.05 | 0.05 |
| Expander | 0.50 | 0.50 |
| Discrete carbon nanotubes | 0.00 | 0.13 |
| Polyvinylalcohol | 0.00 | 0.20 |
| Water | 9.59 | 9.56 |
| Sulfuric acid 1.4 specific gravity | 8.20 | 8.17 |

What is claimed is:

1. A homogeneous aqueous fluid comprising:
   discrete carbon nanotubes comprising oxygen moieties in a weight range of 0.5 to 8% by weight of the carbon nanotube; and
   at least one surfactant,
   wherein 0.6≤V*(L/D)≤3, wherein V is the volume fraction, L is the average length of the carbon nanotube in nanometers, D is the average diameter of the carbon nanotube in nanometers, and wherein the fluid has a viscosity less than 3 Poise at 25° C.

2. The fluid of claim 1 wherein at least one of the surfactants is at least partially bound to the discrete carbon nanotube.

3. The fluid of claim 1 wherein a majority of discrete carbon nanotubes are open ended.

4. The fluid of claim 1 wherein residual catalyst from making the carbon nanotubes is less than 2% by weight of the carbon nanotubes.

5. The fluid of claim 1 further comprising at least one other species selected from the group of carbonaceous materials.

6. The fluid of claim 1 wherein the surfactant is present in an amount suitable to obtain a carbon nanotube:surfactant weight ratio from 1:0.2 to 1:3.

7. The fluid of claim 1 wherein the surfactant comprises a polymer soluble in the fluid to at least 0.5% by weight relative to the weight of fluid.

8. The fluid of claim 1 wherein the surfactant comprises a polymer further comprising an oxygen and/or sulfur moiety; preferably having a molecular weight of less than 200 kDa.

9. The fluid of claim 1 wherein the surfactant comprises polyvinyl alcohol or polyvinyl alcohol copolymer, wherein at least 50% by mole of the vinyl units comprise hydroxyl groups.

10. The fluid of claim 1 wherein the surfactant comprises polystyrene sulfonate.

11. The fluid of claim 1, being temperature stable, wherein the fluid maintains a pourable viscosity from 0° C. to 60° C.

12. The fluid of claim 1, wherein the surfactant is biocompatible.

13. The fluid of claim 1, wherein 10% or less of the discrete carbon nanotubes comprise an L/D of 100 to 200, and about 30% or more of the discrete carbon nanotubes comprise an L/D of 40 to 80.

14. The fluid of claim 1, wherein the L/D distribution is asymmetrical meaning that a relatively small percent of discrete carbon nanotubes has a specific L/D while a greater amount comprises another aspect ratio distribution.

15. A lead acid electroactive paste comprising the fluid of claim 1.

16. A lithium ion electroactive paste comprising the fluid of claim 1.

17. A photovoltaic photoactive paste comprising the fluid of claim 1.

18. An electrolyte comprising the fluid of claim 1.

19. An ink comprising the fluid of claim 1.

20. A method to obtain an aqueous homogeneous fluid comprising discrete carbon nanotubes and surfactant, wherein a volume fraction, V, of the carbon nanotubes in the fluid is in the range determined from the equation $0.6<V*(L/D)<3$, wherein L is the average length of the carbon nanotube in nanometers, D is the average diameter of the carbon nanotube in nanometers, and wherein the aqueous fluid has a viscosity less than 3 Poise at 25° C., comprising:
 a) forming a mixture comprising 2-50% by weight of discrete carbon nanotubes, the discrete carbon nanotubes having surfaces comprising oxygen moieties in the weight range of 0.5 to 8% by weight of the discrete carbon nanotubes, in at least one aqueous fluid,
 b) adding at least one surfactant to the carbon nanotube mixture in an amount suitable to obtain a carbon nanotube:surfactant weight ratio from 1:0.2 to 1:3,
 c) optionally, adding the surfactant as a solution to the fluid,
 d) adjusting pH of the aqueous fluid to between 4 and 9,
 e) optionally, adjusting the carbon nanotube volume concentration with additional aqueous fluid, and
 f) agitating the mixture while maintaining the temperature below 35° C.

\* \* \* \* \*